J. S. SURBAUGH.
SHOVEL, SCOOP, &c.
APPLICATION FILED MAY 14, 1917.
1,247,032.
Patented Nov. 20, 1917.
3 SHEETS—SHEET 1.
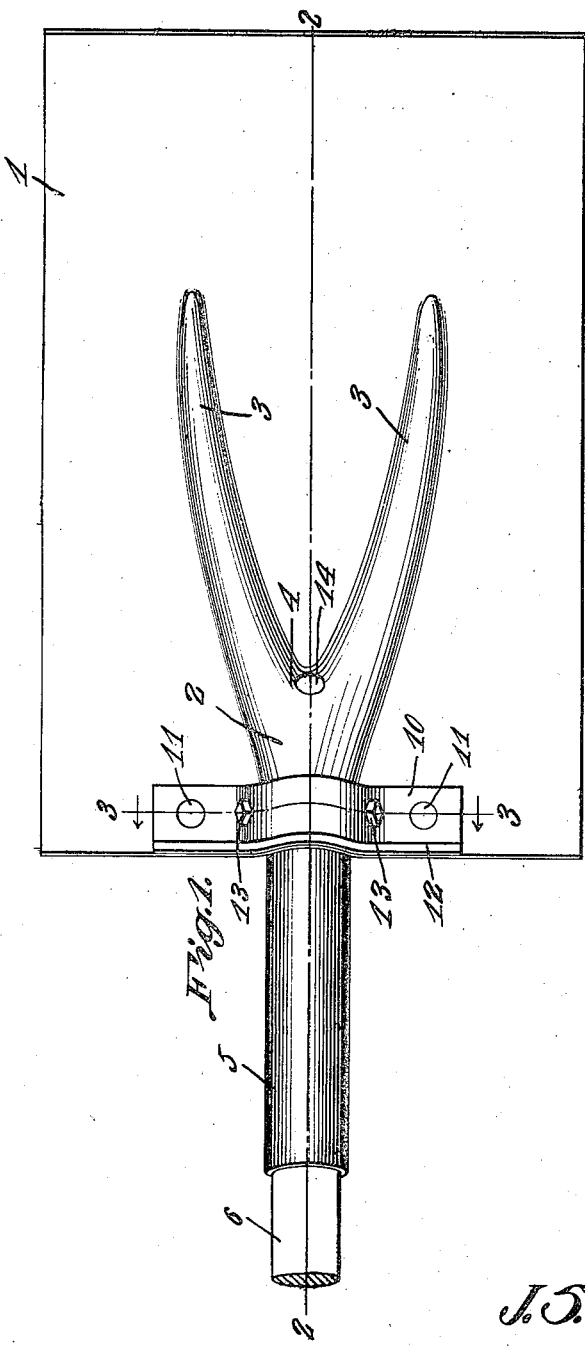
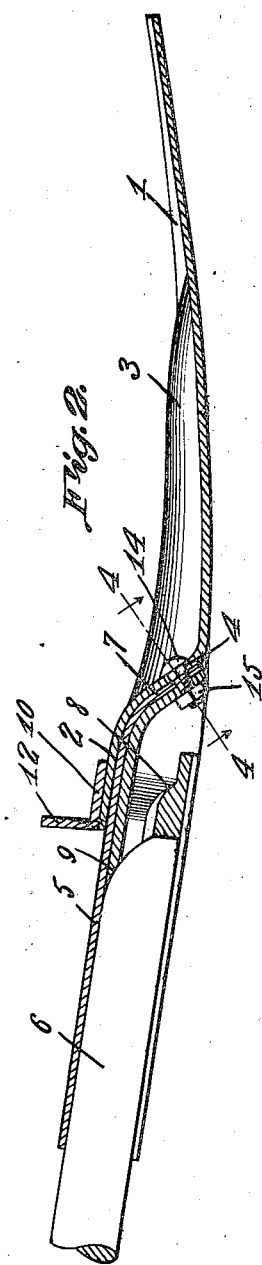
J. S. Surbaugh, Inventor

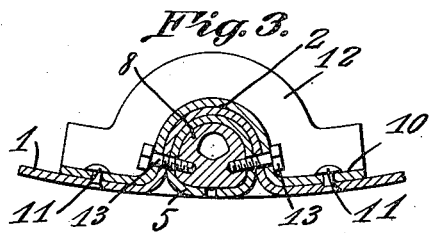
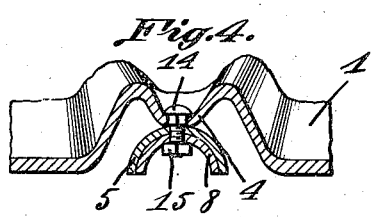
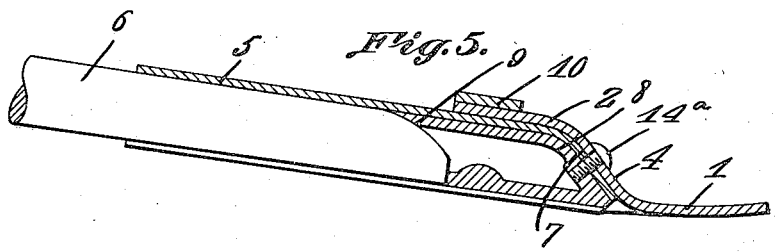
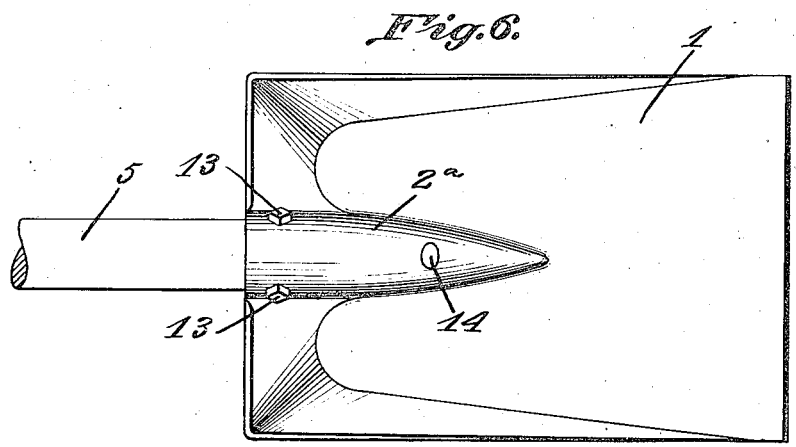

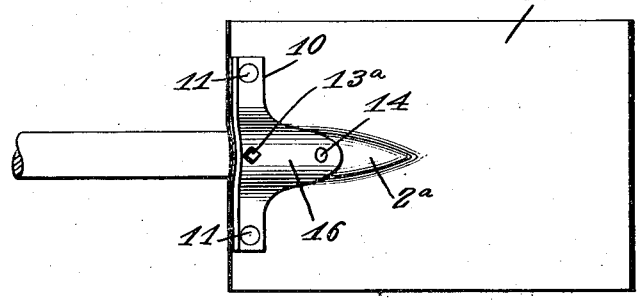
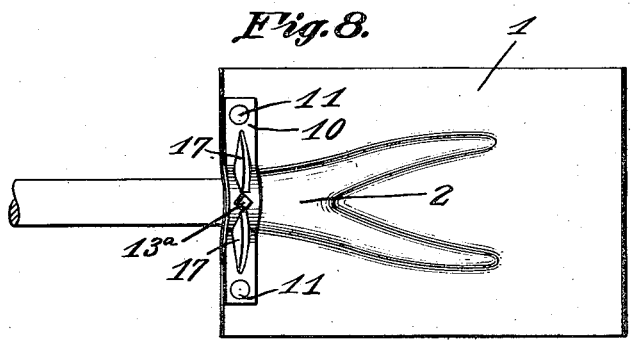
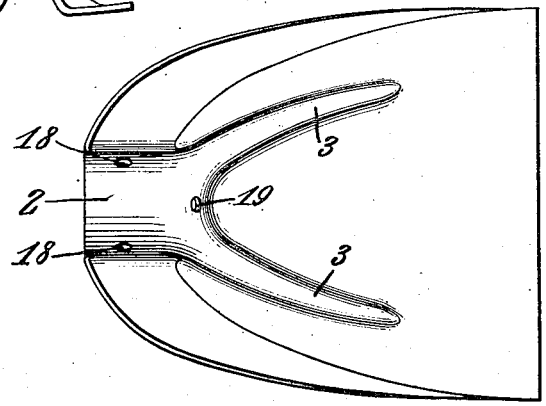

UNITED STATES PATENT OFFICE.

JOHN S. SURBAUGH, OF VINCENNES, INDIANA.

SHOVEL, SCOOP, &c.

1,247,032. Specification of Letters Patent. Patented Nov. 20, 1917.

Application filed May 14, 1917. Serial No. 168,462.

*To all whom it may concern:*

Be it known that I, JOHN S. SURBAUGH, a citizen of the United States, residing at Vincennes, in the county of Knox and State of Indiana, have invented a new and useful Improvement in Shovels, Scoops, &c., of which the following is a specification.

The present invention appertains to shovels, scoops, spades, and kindred implements, and aims to provide novel and improved means for detachably connecting the handle and blade, whereby such connection can be accomplished economically and successfully, to resist the prying, torsional, leverage and other strains to which the implement is subjected in use, and to enable the blade, when worn out or broken, to be readily replaced by another one, using the same handle, thus enabling the worn out or broken parts to be readily replaced at less expense to the user.

It is also the object of the invention to accomplish the rigid attachment of the handle and blade, so that the implement will be thoroughly practical, economical and feasible from a manufacturing standpoint, the blade and connection thereof with the handle being thoroughly substantial and reinforced to withstand wear and tear.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein—

Figure 1 is a plan view of a spade or equivalent implement embodying the improvements, a portion of the handle being broken off.

Fig. 2 is a longitudinal section on the line 2—2 of Fig. 1.

Fig. 3 is a cross section on the line 3—3 of Fig. 1.

Fig. 4 is a sectional detail on the line 4—4 of Fig. 2.

Fig. 5 is a longitudinal sectional detail illustrating a modification.

Figs. 6, 7 and 8 are plan views illustrating various modifications.

Fig. 9 is an elevation of a reinforcing strap used in the implement shown in Fig. 8.

Fig. 10 is a plan view of a different type of blade, such as used in shovels and scoops.

Referring particularly to Figs. 1 to 4, inclusive, wherein the improvements are shown as embodied in a spade or equivalent implement, although it is to be understood that they can be used in shovels, scoops, and the like, with equal facility, the blade is designated at 1, and is provided between its side edges with an upstanding roll 2 extending longitudinally from its rear end or wall and bifurcated or forked, to provide the forwardly diverging flanges or ribs 3, which are struck upwardly, the same as the roll 2, to stiffen and reinforce the blade, as disclosed in my Patent No. 1,212,582 granted January 16, 1917.

In carrying out the invention, there is provided a tubular handle member 5, which may itself constitute the shank of the handle, or which may receive a wooden or equivalent shank 6, in which event the member 5 serves as a socket for the shank proper. The member 5 is preferably constructed of sheet metal bent transversely so that its edges meet at the bottom, although this is not compulsory. The member 5 is of tubular form, and may be of different constructions, according to the circumstances. The outer end of the member 5 is tapered and curved, as at 7, to abut against the web 4 between the basal ends of the ribs 3, whereby to transmit the longitudinal thrust of the handle to the blade in an effective manner, the member 5 fitting snugly within and under the roll 2, whereby to hold the blade and handle firmly in longitudinal alinement. The web 4 is inclined abruptly from the roll 2 between the ribs 3, and serves as an abutment for the outer end of the member 5 which fits under the roll 2.

An anchor member 8, preferably a metallic casting, is fitted in the outer terminal of the tubular member 5, and is so shaped as to fit snugly in said member, where said member fits within the roll 2. The anchor member 8 is preferably provided with an upper inwardly or rearwardly projecting tongue 9 fitting the top or crest of the member 5, and overlapping the shank 6 if it is used, whereby to stiffen the handle structure and avoiding the bending or breaking thereof at the point of connection. This anchor member 8 is used for the anchoring of the securing elements which fasten the handle and blade together, as will hereinafter more fully appear.

A transverse metallic strap 10 rests upon the blade 1 adjacent to its rear or inner end, and its terminals are secured by means of rivets 11 or other suitable securing elements upon the blade at the opposite sides of the roll 2, the intermediate portion of the strap 10 being arched upwardly to fit snugly over the roll. This strap or bar 10 serves to stiffen and reinforce the rear end portion of the blade and roll 2, and the rear edge of the strap 10 is preferably provided with an outstanding flange 12 to further strengthen the structure, and this flange can be used as a foot piece to force the blade into the ground, especially when spading.

A pair of screws 13 or other suitable securing elements are engaged downwardly through apertures in the side portions of the arch of the strap 10 and apertures in the side portions of the roll 2, and said screws extend through apertures in the member 5 and are threaded into apertures with which the anchor member 8 is provided, thereby securely fastening the members 5 and 8 within the roll 2. In addition to this, a bolt 14 or similar securing element is engaged downwardly through an aperture provided in the web 4 and an aperture in the outer end portion of the member 5, and a nut 15 is threaded upon the lower terminal of said bolt and seats within the cavity of the member 8 which is hollow. The bolt 14 is preferably provided with a square or non-circular portion engaging the web 4, to prevent the bolt from turning, in order that when the screw threads become rusted, the nut can be unscrewed for replacing the parts. The nut 15 is housed within the member 8, so as to be out of the way, and the rounded head 14 in seating against the web 4, will be housed between the ribs 3, so as to be out of the way, and not interfere with the use of the implement. The bolt 14 serves to draw the outer or forward end of the member 5 against the abutment or web 4, whereby the thrust of the handle is transmitted to the blade, without subjecting the securing elements to unnecessary shearing strain. By fitting the member 5 within the roll 2, and providing the anchor member 8 within the member 5 to which the securing elements are engaged, there is provided a highly satisfactory and commercially successful means for attaching the handle and blade together. The sheet metal portions of the blade 1 and the member 5 are clamped between the casting or anchor member 8 and the clamp or bar 10, whereby the parts cannot tear loose.

In the modification shown in Fig. 5, the strap 10 is not provided with the flange 12, and the bolt 14 above described is substituted by a screw 14$^a$ which screws into the anchor member 8.

Fig. 6 illustrates a plane roll 2$^a$, which is not bifurcated, without the use of the strap or bar 10, the securing elements 13 and 14 engaging downwardly directly through the roll and bearing thereagainst.

As shown in Fig. 7, the strap 10 has a forwardly projecting tongue 16 overlapping the roll 2$^a$ and through which the securing element 14 also engages. A single securing element 13$^a$ is used in this case, at the crest or crown of the strap 10 and roll 2$^a$.

Fig. 8 also illustrates the use of a single securing element 13$^a$ on the bifurcated roll 2, the strap 10 being stiffened by the provision of webs 17 between the terminals and the arch thereof.

Fig. 10 shows a different type of blade, having the bifurcated roll 2 provided with the side apertures 18 for the securing elements 13, and provided at its crotch with an aperture 19 for the securing element 14.

Other selections of the improved features can be used in various implements, as circumstances or conditions may dictate.

Having thus described the invention, what is claimed is:—

1. An implement including a blade having a roll forming an abutment, a handle member fitting in said roll, and means securing said member within the roll and drawing it against said abutment.

2. An implement including a blade having a bifurcated roll, a handle member fitting within said roll, securing means engaging through said roll and fastening said member therein, and securing means at the crotch of the roll securing the handle thereto.

3. An implement including a blade having a bifurcated roll with an abutment at its crotch, a handle member fitting within the roll against said abutment, and means for securing the handle member within the roll and drawing it against said abutment.

4. An implement including a blade having a roll providing an abutment, a handle member fitting in said roll, securing elements extending through the sides of the roll for holding said member therein, and a securing element extending through said abutment for clamping said member thereto.

5. An implement including a blade having a roll providing an abutment, a handle member fitting in said roll, a strap secured to the blade and arched over said roll, securing means connecting the arched portion of the strap and handle member for securing them together, and securing means for drawing the handle member against said abutment.

6. An implement including a blade having a roll, a handle member fitting within the roll, an anchor member fitting within the handle member, and securing means connecting the blade and anchor member for clamping the handle member therebetween.

7. An implement including a blade having a roll, a tubular handle member fitting within the roll, an anchor member fitting within the tubular member, and securing means connecting the blade and anchor member for clamping the handle member therebetween.

8. An implement including a blade having a roll and stiffening means extending over said roll, a handle member fitting within the roll, an anchor member within the handle member, and securing means connecting said stiffening means and anchor member to clamp the blade and handle member between them.

9. An implement including a blade having a roll providing an abutment, a strap secured to the blade and arched over said roll, a tubular handle member fitting within said roll and against said abutment, an anchor member fitting within the tubular member, securing means connecting the arched portion of the strap and anchor member to clamp the parts together, and securing means extending through the abutment for clamping the handle member thereto.

10. An implement including a blade having a bifurcated roll with an abutment at its crotch and stiffening means extending over said roll, a handle member fitting within the roll, securing means connecting said stiffening means and handle member to clamp the blade between them, and securing means for drawing the handle member against said abutment.

11. An implement including a blade having a forked roll, stiffening means extending over said roll, a handle member fitting within the roll, securing means connecting said stiffening means and handle member to clamp the blade between them, and securing means for drawing the handle member against the forked part of said roll.

12. An implement including a blade having a roll, an angle shaped reinforcement secured to the blade and extending over said roll, a handle member fitting within the roll, and securing means connecting said reinforcement and handle member to clamp the blade between them.

13. An implement including a blade having a bifurcated roll with an abutment at its crotch, a reinforcement extending over said roll, a tubular handle member fitting within said roll and against said abutment, an anchor member fitting within the tubular member, securing means connecting the reinforcement and anchor member to clamp the blade and handle member between them, and securing means extending through the abutment for drawing the handle member thereto.

In testimony that I claim the foregoing as my own, I have hereto affixed my signature in the presence of two witnesses.

JOHN S. SURBAUGH.

Witnesses:
GERTRUDE McDONALD,
ROBT. A. CROSS.